(12) United States Patent
Matsuda et al.

(10) Patent No.: US 7,761,889 B2
(45) Date of Patent: Jul. 20, 2010

(54) DISC CARTRIDGE PROTECTING MEMBER, AND DISC CARTRIDGE

(75) Inventors: Mikinori Matsuda, Kanagawa (JP); Kazuhito Kurita, Kanagawa (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 11/296,612

(22) Filed: Dec. 7, 2005

(65) Prior Publication Data
US 2006/0288360 A1 Dec. 21, 2006

(30) Foreign Application Priority Data
Dec. 9, 2004 (JP) ............................ P2004-357245

(51) Int. Cl.
*G11B 23/03* (2006.01)
(52) U.S. Cl. .................. 720/732; 720/739; 360/133
(58) Field of Classification Search ................. 360/720, 360/725, 728, 732, 733, 736, 133; 206/308.1, 206/308.2; 720/720, 725, 728, 732, 733, 720/736
See application file for complete search history.

(56) References Cited

U.S. PATENT DOCUMENTS

| | | | | |
|---|---|---|---|---|
| 4,945,530 | A | | 7/1990 | Sandell et al. |
| 5,140,489 | A | * | 8/1992 | Barnard ....................... 360/133 |
| 5,475,674 | A | * | 12/1995 | Yamashita et al. .......... 720/735 |
| 5,540,328 | A | * | 7/1996 | Kohtake ................... 206/308.1 |
| 5,677,898 | A | * | 10/1997 | Hasegawa et al. ......... 369/30.66 |
| 5,923,630 | A | * | 7/1999 | Yoshida et al. .............. 720/720 |
| 5,963,537 | A | * | 10/1999 | Fujisawa .................... 720/744 |
| 5,988,374 | A | * | 11/1999 | Funawatari et al. ....... 206/308.1 |
| 6,296,115 | B1 | * | 10/2001 | Kurosawa et al. ........ 206/308.1 |
| 6,345,035 | B1 | * | 2/2002 | Aoki et al. .................. 720/720 |
| 6,349,087 | B1 | * | 2/2002 | Okamoto et al. ............ 720/720 |
| 6,431,353 | B1 | * | 8/2002 | Mizutani ................. 206/308.3 |
| 6,463,028 | B1 | * | 10/2002 | Koshiyouji ................. 720/720 |

(Continued)

FOREIGN PATENT DOCUMENTS

EP 0079110 5/1983

(Continued)

*Primary Examiner*—Brian E Miller
(74) *Attorney, Agent, or Firm*—Wolf, Greenfield & Sacks, P.C.

(57) ABSTRACT

The present invention provides a disc cartridge protecting member capable of closing a write and/or read aperture larger relative to the size of the disc cartridge and protecting a disc housed in the disc cartridge, such as optical disc used as an information recording medium. The disc cartridge protecting member includes an aperture closing plate which is to be fitted in, and to close, an aperture formed at one side of a disc cartridge having a disc housed rotatably therein and through which part of the disc is exposed to outside in a range between inner and outer radii thereof, an entry limiting portion supported on supports provided in the aperture formed in the disc cartridge to prevent the aperture closing plate from entering the disc cartridge, a cover plate extending on the other side of the disc cartridge opposite to the one side at which the aperture is formed, and a connecting plate to connect the base end of the aperture closing plate and that of the cover plate to each other. The protecting member is installed removably with the disc cartridge being held between the aperture closing plate and cover plate.

17 Claims, 5 Drawing Sheets

U.S. PATENT DOCUMENTS

| | | | |
|---|---|---|---|
| 6,880,167 B2 * | 4/2005 | Oishi et al. | 720/725 |
| 2002/0064125 A1 | 5/2002 | Shimada et al. | |
| 2002/0093907 A1 * | 7/2002 | Thayne | 369/289 |
| 2005/0210491 A1 * | 9/2005 | Ohgi | 720/725 |
| 2005/0278730 A1 * | 12/2005 | Ohgi | 720/728 |
| 2006/0123442 A1 * | 6/2006 | Kurita et al. | 720/725 |

FOREIGN PATENT DOCUMENTS

| | | |
|---|---|---|
| EP | 0174651 | 3/1986 |
| JP | 61-006974 | 1/1986 |
| JP | 07-176162 | 7/1995 |
| JP | 07-330066 | 12/1995 |
| JP | 03-198359 | 4/2003 |

* cited by examiner

DISC CARTRIDGE PROTECTING MEMBER, AND DISC CARTRIDGE

CROSS REFERENCES TO RELATED APPLICATIONS

The present invention contains subject matter related to Japanese Patent Application JP 2004-357245 filed in the Japanese Patent Office on Dec. 9, 2004, the entire content of which is incorporated herein by reference.

BACKGROUND OF THE INVENTION

1. Field of the Invention

The present invention relates to a disc cartridge protecting member including an aperture closing plate which is to be installed removably on a disc cartridge housing a disc such as an optical disc or the like as an information recording medium and which closes an aperture through which part of the disc is to be exposed to outside in a range between inner and outer radii thereof and a write and/or read unit is to face the disc, and to a disc cartridge with the protective member.

2. Description of the Related Art

In the past, many types of disc cartridges are used. Each of them has a disc-shaped recording medium such as optical disc housed rotatably in a body thereof, and it is to be loaded in a disc recording and/or playback apparatus with the disc-shaped recording medium being kept housed in the cartridge body. The disc cartridge of this type can protect the disc-shaped recording medium housed therein, and facilitate loading and unloading of the disc-shaped recording medium into and from the disc recording and/or playback apparatus.

The above disc cartridge has formed therein a write and/or read aperture through which part of the signal recording area of, for example, an optical disc housed in the cartridge body is exposed to outside in a range between inner and outer radii thereof. An optical pickup or a magnetic head of a write/read means provided at the disc recording and/or playback apparatus faces the write and/or read aperture and writes or reads information signals to or from the optical disc by scanning the signal recording area.

However, if the write and/or read aperture formed in the cartridge body is left open, dust will possibly come into the cartridge body and contaminate the optical disc during storage of the disc cartridge or foreign matter coming into the cartridge body will possibly damage the optical disc during insertion or ejection of the optical disc into or from the disc recording and/or playback apparatus.

To overcome the above problems, the disc cartridge has installed thereon a shutter member to open and close the write and/or read aperture. Since the shutter member closes the write and/or read aperture while the disc cartridge is being stored or while the disc cartridge is not loaded in the disc recording and/or playback apparatus, the optical disc housed in the cartridge body can positively be protected.

A disc cartridge of this type to which the shutter member to open and close the write and/or read aperture is removably installed is disclosed in the Japanese Patent Application JP 2003-109350.

SUMMARY OF THE INVENTION

Note here that it has been required that the disc-shaped recording media, especially, optical discs, from and/or to which information signals are to be written or read, should be higher in recording density and larger in recording capacity. On this account, there have been proposed an optical disc designed higher in recording capacity and so small that it can be held as a whole in the palm of one hand.

In the disc cartridge designed smaller as above, it is difficult to form a smaller write and/or read aperture correspondingly to the size of the disc cartridge.

For example, it is difficult to form a smaller optical pickup which writes and/or reads information signals to and/or from an optical disc by scanning the signal recording area of the optical disc because the optical pickup includes an objective lens to focus a light beam to the optical disc and an actuator to move the objective lens as essential elements.

To write or read information signals to or from a high-density optical disc, an optical pickup has to be moved to near the optical disc. This is intended to reduce the spot diameter of a light beam focused on the optical disc through an objective lens having a large numerical aperture NA. For the optical pickup to access the optical disc, at least part of the optical pickup has to be moved into the disc cartridge.

For movement, into the disc cartridge, of the optical pickup difficult to design smaller correspondingly to the smaller size of the disc cartridge, the write and/or read aperture has to be formed larger. However, if the write and/or read aperture thus formed is larger relative to the size of the disc cartridge, a shutter member large enough to open and close the aperture cannot be installed movably in the plane of the disc cartridge. Therefore, it will be difficult to open and close the write and/or read aperture and protect the optical disc housed in the disc cartridge.

It is therefore desirable to overcome the above-mentioned drawbacks of the related art by providing a disc cartridge protecting member capable of closing a write and/or read aperture larger relative to the size of the disc cartridge and protecting a disc housed in the disc cartridge, such as optical disc used as an information recording medium.

It is also desirable to provide a disc cartridge protecting member capable of closing a write and/or read aperture formed in the disc cartridge.

It is also desirable to provide a disc cartridge protecting member capable of closing a write and/or read aperture formed in a thinner disc cartridge.

It is also desirable to provide a disc cartridge having installed thereon a protecting member capable of closing a write and/or read aperture larger relative to the size of a cartridge body and protecting a disc housed in the cartridge body.

According to the present invention, there is provided a disc cartridge protecting member including an aperture closing plate which is to be fitted in, and to close, an aperture formed at one side of a disc cartridge having a disc housed rotatably therein and through which part of the disc is exposed to outside in a range between inner and outer radii thereof; an entry limiting portion supported on supports provided in the aperture formed in the disc cartridge to prevent the aperture closing plate from entering the disc cartridge; a cover plate extending on the other side of the disc cartridge opposite to the one side at which the aperture is formed; and a connecting plate to connect the base end of the aperture closing plate and that of the cover plate to each other, the protecting member being removably installed with the disc cartridge being held tight between the aperture closing plate and cover plate.

The protecting member is installed supporting the disc cartridge between the aperture closing plate and cover plate to close the aperture by the aperture closing plate. The aperture closing plate is prevented from entering the disc cartridge with the entry limiting portion being supported on the supports provided at the disc cartridge.

The disc cartridge protecting member according to the present invention further includes a cartridge support that engages on part of the disc cartridge to support the disc cartridge.

The aperture closing plate has formed at the free end thereof an entering portion that will enter the disc cartridge through the aperture when the aperture closing plate is fitted into the aperture in the disc cartridge.

Being flush with the one side of the disc cartridge, the aperture closing plate is to be fitted in the aperture.

The disc cartridge protecting member includes an incorrect-insertion preventing portion to prevent incorrect insertion of the disc cartridge from into a disc recording and/or playback apparatus. The incorrect-insertion preventing portion is formed from the cover plate.

Also, the cover plate is made of a transparent material through which the other side of the disc cartridge can be seen when the cover plate is installed to the disc cartridge. Alternatively, the cover plate has formed therein a window through which the other side of the disc cartridge is exposed to outside.

Also, there is provided a disc cartridge including a cartridge body having a disc housed rotatably therein and having formed at one side thereof an aperture through which part of the disc is exposed to outside in a range between inner and outer radii thereof; and a disc cartridge protecting member including an aperture closing plate which is to be fitted in, and to close, an aperture formed at one side of a disc cartridge having a disc housed rotatably therein and through which part of the disc is exposed to outside in a range between inner and outer radii thereof; an entry limiting portion supported on supports provided in the aperture formed in the disc cartridge to prevent the aperture closing plate from entering the disc cartridge; a cover plate extending on the other side of the disc cartridge opposite to the one side at which the aperture is formed; and a connecting plate to connect the base end of the aperture closing plate and that of the cover plate to each other, the protecting member being removably installed to the cartridge body with the cartridge body being held tight between the aperture closing plate and cover plate.

Once installed to the disc cartridge, the disc cartridge protecting member according to the present invention can close the aperture formed in the disc cartridge and through which the disc is exposed to outside, and protect the disc in the disc cartridge.

Also, since the disc cartridge protecting member according to the present invention can be installed with the aperture closing plate not projecting from the disc cartridge, so the disc cartridge having the protecting plate installed thereon can be designed thinner.

Further, the disc cartridge protecting member, once installed to the disc cartridge, can prevent the disc cartridge from being incorrectly inserted into a disc recording and/or playback apparatus.

Moreover, since the other side of the disc cartridge can be seen through the cover plate fitted to the disc cartridge, a label and print on the other side of the disc cartridge can be viewed to know the type of the disc cartridge.

Furthermore, since in the disc cartridge according to the present invention, the aperture through which the disc is exposed to outside can be closed by the removable protecting member, even an aperture formed larger relative to the size of the cartridge body can positively be closed and the disc housed in the disc cartridge can thus be protected positively.

DETAILED DESCRIPTION OF THE PREFERRED EMBODIMENTS

Figure 1:
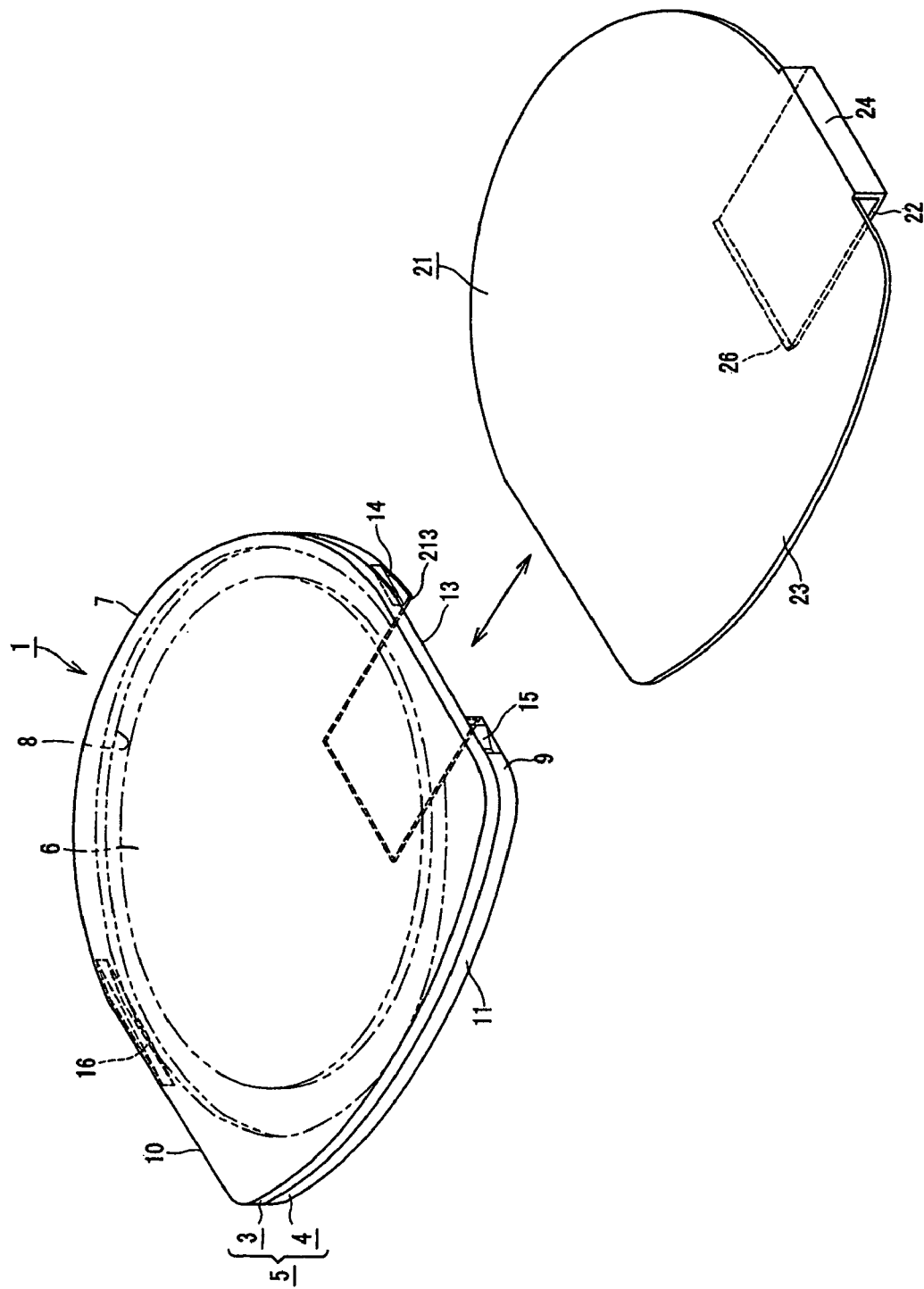
FIG. 1 is a perspective view, from the upper half, of the disc cartridge protecting member according to the present invention and disc cartridge having the protecting member installed thereon.

The disc cartridge protecting member according to the present invention and disc cartridge having the protecting member installed thereon will be described in detail below with reference to the accompanying drawings.

The disc cartridge having installed removably thereon the disc cartridge protecting member according to the present invention will be explained. The disc cartridge is generally indicated with a reference numeral 1. As will be seen from FIGS. 1 and 2, the disc cartridge 1 includes a body 5 formed from a pair of body halves 3 and 4, upper and lower, butt-joined to each other. This cartridge body 5 has housed rotatably therein an optical disc 6 as a disc-shaped recording medium.

The disc cartridge 1 houses the optical disc 6 having recorded therein program data and video data for performing a video game, for example, and it is designed very small. This disc cartridge 1 houses, for example, an optical disc 6 of about 60 mm in diameter, and it is designed to have so small a size that it can be held as a whole in the palm of one hand.

Note that the disc cartridge 1 referred to herein by way of example houses a read-only optical disc 6 having pre-recorded therein information signals such as program data.

Figure 2:
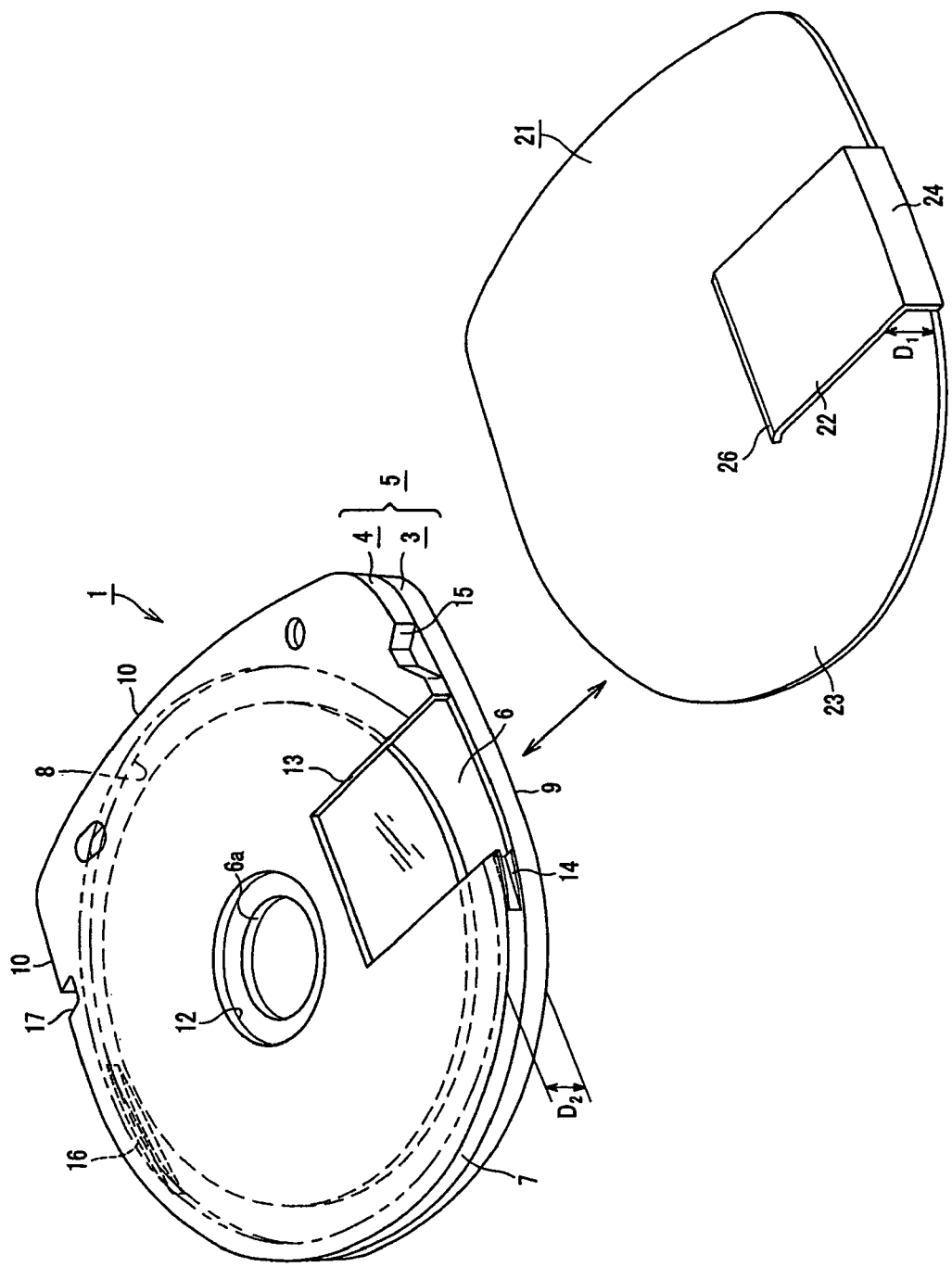
FIG. 2 is also a perspective view, from the lower half, of the disc cartridge protecting member according to the present invention and disc cartridge having the protecting member installed thereon.

As shown in FIGS. 1 and 2, the body 5 of the disc cartridge 1 has a circular-formed front side 7 at which the disc cartridge 1 is first inserted into a disc recorder/player. The circular front side 7 is generally a half of a circle taking, as its center, the center of the optical disc 6 received in a disc receptacle 8 formed in the cartridge body 5 and which has a radius a little larger than that of the optical disc 6. That is, the circular front side 7 corresponds in shape to a half of the optical disc 6 housed in the cartridge body 5.

In the cartridge body 5, the circular front side 7 is contiguous at opposite ends thereof to lateral sides 9 and 10, respectively, opposite and parallel to each other, and these lateral sides 9 and 10 are contiguous to a rear side 11 opposite to the circular front side 7 and which is gently curved. That is, the rear side 11 of the cartridge body 5 is smaller in curvature and larger in radius than the semicircular front side 7.

The disc cartridge 1 has the nearly semicircular front side 7 at which it is first inserted into the disc recorder/player, and also the rear side 11 opposite to the circular front side 7 is curved. Thus, the disc cartridge 1 can be formed nearly as small as the optical disc 6 which is to be housed in the disc cartridge 1.

As shown in FIG. 2, the lower half 4 as the bottom of the cartridge body 5 has formed at the center thereof a circular central opening 12 through which a central hole 6a formed at the center of the optical disc 6 housed in the cartridge body 5 and its rim are exposed to outside. Part of a disc rotation driving mechanism, for example, a turn-table, provided at the disc recorder/player in which the disc cartridge 1 is to be loaded is to enter the central opening 12.

As shown in FIG. 2, the lower half 4 as the bottom of the cartridge body 5 has also formed therein a write and/or read aperture 13 (will also be referred to as "disc-access aperture" hereunder) through which the optical head is to access the optical disc for write and/or read of information signals to and/or from the latter. The disc-access aperture 13 is located at one (9) of the lateral sides (9 and 10) of the cartridge body 5. It is shaped rectangular to have a sufficient size to expose part of the signal recording area of the optical disc 6 housed in the cartridge body 5 to outside in a range between inner and outer radii. That is, the disc-access aperture 13 is formed along the one lateral side 9, other than the circular front side 7, of the cartridge boy 5 and which is straight and flat. Also, the disc-access aperture 13 is opened by cutting the lower half 4 at the one lateral side 9 as shown in FIG. 2.

The disc-access aperture 13 formed in the disc cartridge 1 according to this embodiment is shaped to have a sufficient size to allow entry of part of the optical pickup included in the write and/or read means provided at a disc recording and/or playback apparatus (will also be referred to as "disc recorder/player" hereunder) compatible with the disc cartridge 1. That is, the disc-access aperture 13 has a size large enough to allow entry of part of the optical pickup including an objective lens that focuses a light beam on a disc housed in the cartridge body 5. Therefore, the disc-access aperture 13 has an area larger relative to the size of the cartridge body 5.

Also, for compatibility with a disc recorder/player compatible with a disc cartridge providing with a shutter member, the disc cartridge 1 according to this embodiment has formed in the one lateral side 9 of the cartridge body 5 a moving-piece guide recess 14 in which a shutter member moving piece provided at the disc recorder/player is to be engaged. The moving-piece guide recess 14 allows the disc cartridge 1 to be loaded into the disc recorder/player by preventing interference between the disc cartridge 1 and the shutter member moving piece at the disc recorder/player.

Also the disc recorder/player compatible with the disc cartridge provided with the shutter member has provided thereon a shutter member supporting mechanism that operates a locking mechanism that locks the shutter member that closes the disc-access aperture and supports the shutter member in the position to open the disc-access aperture. On this account, the disc cartridge 1 according to this embodiment has formed at the one lateral side 9 of the cartridge body 5 a concavity 15 to avoid the pressure of the shutter member supporting mechanism when the disc cartridge 1 is loaded into the disc recorder/player.

Also, the cartridge body 5 has provided at the other lateral side 10 thereof opposite to the one lateral side 9 an incorrect-insertion preventive recess 16 to prevent the disc cartridge 1 from being inserted incorrectly with the upside down into the disc recorder/player, and a loading concavity 17 in which part of a loading mechanism at the disc recorder/player is to be engaged.

The disc-access aperture 13 left opened as above is to be closed by a protecting member 21 installed removably on the disc cartridge 1.

As shown in FIGS. 1 and 2, the protecting member 21 includes an aperture closing plate 22 which is to be fitted in, and to close, the disc-access aperture 13 in the cartridge body 5, a cover plate 23 extending on the other side of the cartridge body 5 opposite to the side where the disc-access aperture 13 is formed and which is to cover the other side, and a connecting plate 24 to connect the base end of the aperture closing plate 22 and that of the cover plate 23 to each other. That is, the protecting member 21 according to this embodiment connects the aperture closing plate 22 and cover plate 23 both extending along both the sides, respectively, of the cartridge body 5 to each other by the connecting plate 24, and thus is shaped to have a C-like section. The protecting member 21 is formed by molding a synthetic resin.

Figure 3:
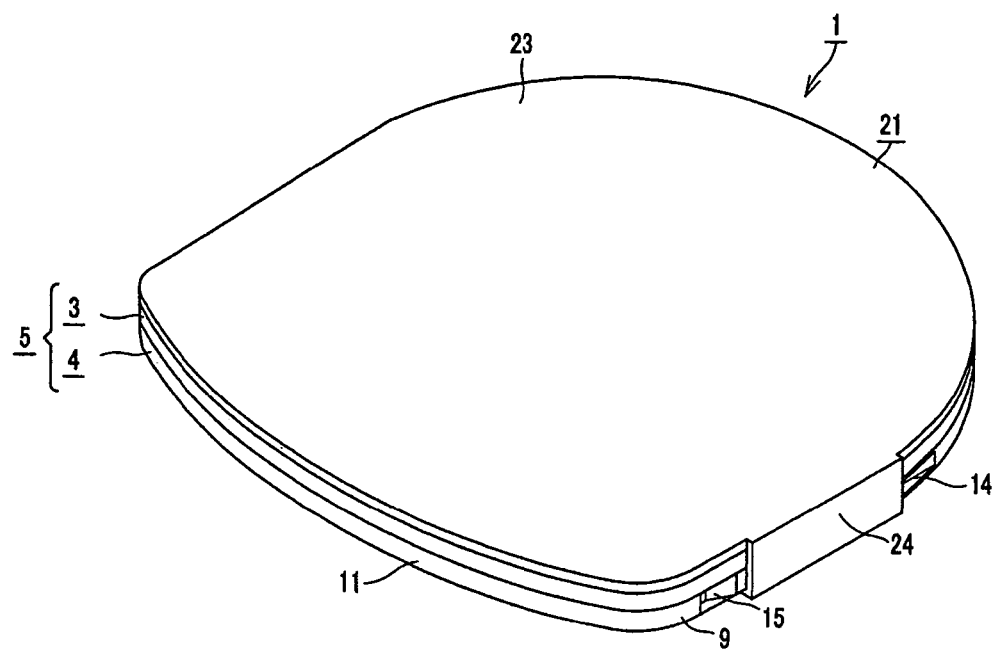
FIG. 3 is a perspective view, from the upper half, of the protecting member according to the present invention, installed on the disc cartridge.
Figure 4:
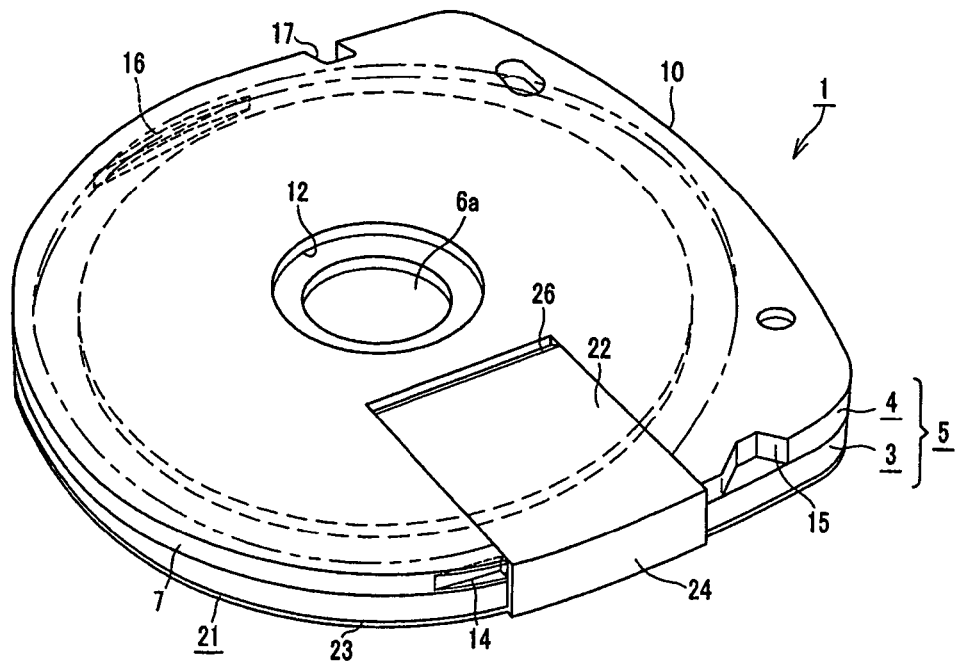
FIG. 4 is a perspective view, from the lower half, of the protecting member according to the present invention, installed on the disc cartridge.

As shown in FIGS. 3 and 4, the protecting member 21 is installed to hold the cartridge body 5 tight between the aperture closing plate 22 fitted in the disc-access aperture 13 and cover plate 23 extending on the other side of the cartridge body 5.

To hermetically close the disc-access aperture 13 when the protecting member 21 is installed to the cartridge body 5, the aperture closing plate 22 is shaped to have an almost same size as the disc-access aperture 13.

Figure 5:
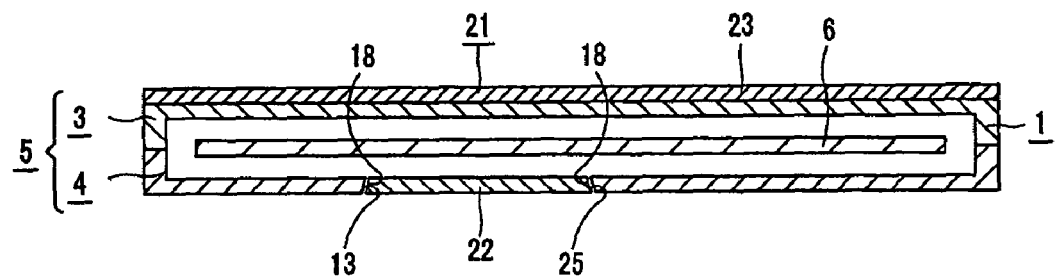
FIG. 5 is a sectional view of the disc cartridge with the disc-access aperture being closed by the aperture closing plate.

Also, the aperture closing plate 22 has an entry limiting portion 25 that prevents the aperture closing plate 22 fitted in the disc-access aperture 13 from entering the cartridge body 5 and touching the optical disc 6 as shown in FIG. 5. The entry limiting portion 25 are formed from opposite lateral sides of the aperture closing plate 22. These opposite lateral sides are inclined to form together an angle convergent from their outer ends towards inner ends, while the opposite lateral walls of the disc-access aperture 13 are also inclined to form together an angle divergent from their inner ends toward outer ends. More specifically, when the aperture closing plate 22 is fitted in the disc-access aperture 13, the entry limiting portion 25 including the inclined lateral sides of the aperture closing plate are received on the opposite lateral walls of the disc-access aperture 13. Even if the cartridge body 5 is elastically deformed under any applied external force, the aperture closing plate 22 can be prevented from entering the cartridge body 5.

The above-mentioned inclined lateral walls, opposite to each other, of the disc-access aperture 13 in the cartridge body 5 will be referred to as "closing-plate supports 18". The opposite closing-plate supports 18 are shaped to match the opposite lateral sides of the aperture closing plate 22. Because of the above entry limiting portion 25 as the inclined lateral sides of the aperture closing plate 22 and closing-plate supports 18 as the inclined lateral sides of the disc-access aperture 13, the aperture closing plate 22 can be fitted in the disc-access aperture 13 to be flush with the one side of the cartridge body 5 without projecting from the disc-access aperture 13 as shown in FIG. 5.

Figure 6:
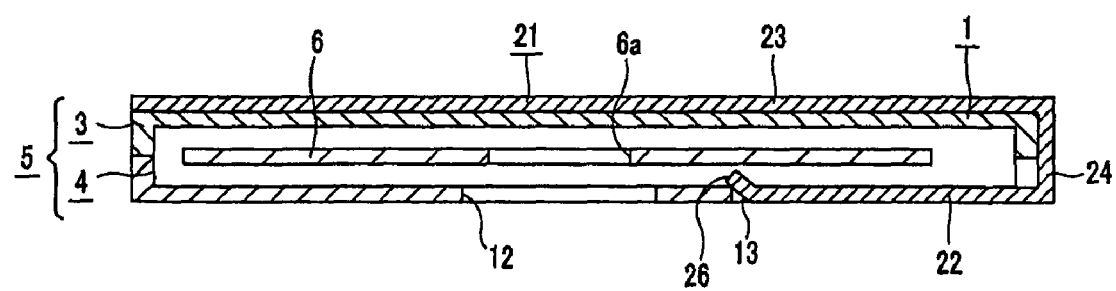
FIG. 6 is also a sectional view of the disc cartridge with the free end of the aperture closing plate being moved into the cartridge body.
Figure 7:
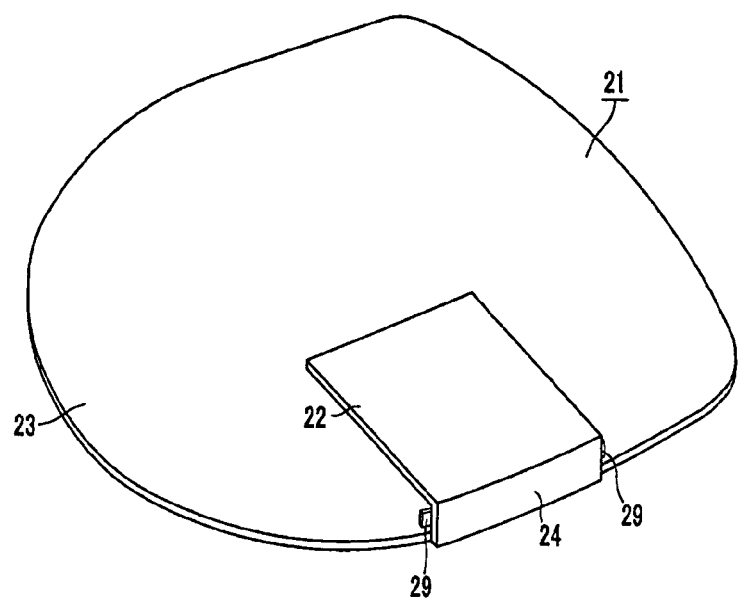
FIG. 7 is a perspective view of the protecting member having the support for the disc cartridge.

Also, the aperture closing plate 22 has formed at the free end thereof a portion 26 that enters the cartridge body 5 through the disc-access aperture 13 as shown in FIG. 6 when the aperture closing plate 22 is fitted in the disc-access aperture 13. The entering portion 26 is shaped to project at a slant into the cartridge body 5 from the free end of the aperture closing plate 22.

Of the protecting member 21 according to this embodiment, the aperture closing plate 22 is fitted in the disc-access aperture 13 with the entry limiting portion 25 thereof as the inclined lateral sides being supported on the closing-plate supports 18 as the inclined lateral sides and the entering portion 26 being put in the cartridge body 5. Thus, the aperture closing plate 22 can positively close the disc-access aperture 13.

Note that the entry limiting portion 25, which prevents the aperture closing plate 22 from entering the cartridge body 5 when the plate 22 is fitted in the disc-access aperture 13, is not limited to the inclined lateral sides mentioned above but may be any one which could be engaged on the opposite lateral walls of the disc-access aperture 13. The entry limiting portion 25 may be, for example, a step formed on either lateral side of the aperture closing plate 22. In this case, either lateral side of the disc-access aperture 13 should be stepped so that the aperture closing plate 22 can be fitted in the disc-access aperture 13 to be flush with the one side of the cartridge body 5.

The cover plate 23, provided opposite to the aperture closing plate 22 to extend on the other side of the cartridge body 5 when the protecting member 21 is installed on the cartridge body 5, is shaped to have such a size to cover almost the entire other side of the cartridge body 5. The cover plate 23 is formed from a transparent material through which the other side of the cartridge body 5 can be seen. Since the cover plate 23 is thus transparent, there can be viewed a label provided on the other side of the cartridge body 5 and having printed thereon contents recorded in the optical disc 6 housed in the cartridge body 5 even with the protecting member 21 is installed on the cartridge body 5.

Note that a label having printed thereon contents recorded in the optical disc 6 may be attached on the cover plate 23 or characters indicating such contents may be printed directly on the cover plate 23. In this case, the cover plate 23 may not be formed from any transparent material.

The connecting plate 24 to connect the base end of the aperture closing plate 22 and that of the cover plate 23 to each other is shaped to have a width almost equal to the thickness of the cartridge body 5 having the protecting member 21 installed thereon. Also, the connecting plate 24 is shaped to have a width equal to that of the aperture closing plate 22. This width is sufficiently large to close a portion of the disc-access aperture 13, opposite to the one lateral side 9 of the cartridge body 5.

Note that the distance D1 between the aperture closing plate 22 and cover plate 23 is smaller than the thickness D2 of the cartridge body 5. Thus, the protecting member 21 is to be installed on the cartridge body 5 while the latter is being pressed between the aperture closing plate 22 and cover plate 23, so that it will be prevented from easily being detached from the cartridge body 5.

The protecting member 21 constructed as above is to be installed on the cartridge body 5 by placing the aperture closing plate 22 on the one side of the cartridge body 5 at which the disc-access aperture 13 is formed and the cover plate 23 on the other side of the cartridge body 5, and inserting the cartridge body 5 into the protecting member 21. At this time, the aperture closing plate 22 is fitted in the disc-access aperture 13 in the cartridge body 5 to close the aperture 13, and the aperture closing plate 22 and cover plate 23 support together the cartridge body 5 under pressure, as shown in FIG. 4. Thus, the protecting member 21 is installed on the cartridge body 5 not to be disengaged from the latter.

Figure 8:
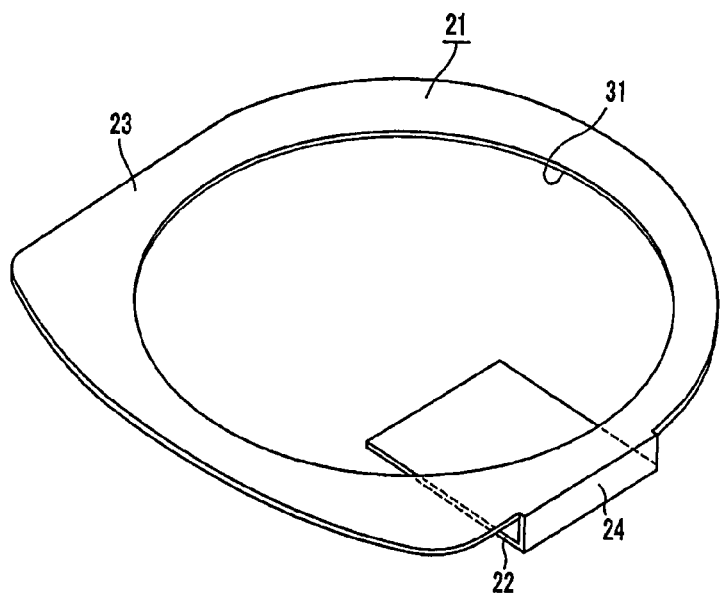
FIG. 8 is a perspective view of the protecting material having an opening formed in the cover plate.

Note that for more positive supporting of the protecting member 21 on the cartridge body 5, there may be provided a cartridge support that engages on part of the cartridge body 5 to support the protecting member 21 on the cartridge body 5. The cartridge support may be, for example, a pair of elastic engagement claws 29 provided at opposite sides of the connecting plate 24 and which are engaged on both sides of the disc-access aperture 13 as shown in FIG. 8. The engagement claws 29 are shaped to enter the disc-access aperture 13 and be elastically displaced for engagement on opposite sides of a portion of the disc-access aperture 13, opposite to the one lateral side 9 of the cartridge body 5.

Because of the cartridge support including the engagement claws 29, the protecting member 21 can positively be installed on the cartridge body 5 with prevention of detaching from on the cartridge body 5.

When the protecting member 21 according to the present invention is installed on the disc cartridge 1, the cover plate 23 are superposed on the cartridge body 5 and will thus add to the thickness of the disc cartridge 1. Thus, owing to the protecting member 21 thus installed, it is possible to prevent the disc cartridge 1 from being incorrectly inserted into the disc recorder/player. That is, the disc cartridge 1 will be limited from being inserted into a cartridge holder or disc recorder/player, having formed therein a cartridge slot whose size is corresponding to the thickness of the disc cartridge 1.

Therefore, the cover plate 23 functions to prevent the disc cartridge 1 having the protecting member 21 left installed to close the disc-access aperture 13 from being inserted into the disc recorder/player.

The connecting plate 24 of the protecting member 21 is shaped to cover an open portion of the disc-access aperture 13 opposite to the one lateral side 9 of the cartridge body 5. Thus, the connecting plate 24 will prevent further insertion of a shutter member moving piece provided at the disc recorder/player. Namely, it functions to prevent the disc cartridge 1 having the protecting member 21 installed thereon from being inserted into the disc recorder/player.

Of the aforementioned protecting member 21, the cover plate 23 is formed from a transparent material through which the other side of the cartridge body 5 can be seen. For viewing the other side of the cartridge body 5 with the protecting member 21 being installed on the disc cartridge 1, an opening 31 may be formed in the center of the aperture closing plate 22 as shown in FIG. 8.

The cover plate 23 is not limited to the aforementioned one which resiliently supports the cartridge body 5 between itself and aperture closing plate 22 and fully covers the other side of the cartridge body 5, but it may be any one which could cover part of the other side of the cartridge body 5.

As having been described in the foregoing, the protecting member 21 according to the present invention is removably installable on any disc cartridges 1 constructed similarly to each other. However, since the protecting member 21 is to be combined with a specific disc cartridge to provide one disc cartridge, the present invention also covers a disc cartridge.

As in the foregoing, the disc cartridge protecting member 21 according to the present invention is to be installed on the disc cartridge 1 and can positively close the disc-access aperture 13 and positively protect the optical disc 6 housed in the disc cartridge 1.

The disc cartridge housing an optical disc has been described by way of example, but the present invention is of course applicable to many disc cartridges each housing a disc such a magnetic disc, magneto-optical disc or the like.

It should be understood by those skilled in the art that various modifications, combinations, sub-combinations and alterations may occur depending upon design requirements and other factors insofar as they are within the scope the appended claims or the equivalents thereof.

What is claimed is:

1. A disc cartridge comprising:
a cartridge body having a lower side substantially parallel to an upper side, adapted to house a disc and having formed on the lower side an aperture through which part of the disc, when housed, is exposed, the aperture having a first beveled edge provided along at least a portion of a perimeter of the aperture; and
a disc cartridge protecting member adapted to be alternately attached and removed from the cartridge body, the disc cartridge protecting member including:
an aperture closing plate having a free end opposite to a base end and a second beveled edge;
a cover plate; and
a connecting plate to connect the base end of the aperture closing plate and the cover plate to each other, wherein
when the disc cartridge protecting member is attached to the cartridge body the aperture closing plate obstructs the aperture, the first beveled edge is adjacent to the second beveled edge preventing the aperture closing plate from contacting the disc, and the cover plate at least partially covers the upper side of the cartridge body.

2. The disc cartridge of claim 1, wherein the first beveled edge is beveled as to narrow the aperture closer to the upper side and widen the aperture further from the upper side.

3. The disc cartridge of claim 2, wherein when the disc cartridge protecting member is attached to the cartridge body the aperture closing plate lays flush with the lower side.

4. The disc cartridge of claim 1, wherein the disc cartridge protecting member further comprises an entering portion connected to the free end of the aperture closing plate and angled towards the cover plate, wherein when the disc cartridge protective member is attached to the cartridge body the entering portion is at least partially inside the cartridge body.

5. The disc cartridge of claim 1, wherein the aperture is adjacent a side wall of the cartridge body.

6. The disc cartridge system of claim 1, wherein the disc cartridge protecting member further comprises a cartridge support that engages on part of the cartridge body when the disc cartridge protective member is attached to the cartridge body.

7. The disc protection system of claim 1, wherein the cover plate is at least partially made of a transparent material.

8. A optical disc protection system comprising:
a cartridge body adapted to house an optical disc, the cartridge body comprising:
an upper side;
a lower side substantially parallel to the upper side;
a first side wall portion adjacent to the lower side and the upper side;
a second side wall portion, opposite the first side wall, and adjacent to the lower side and the upper side; and
an aperture formed in the lower side and nearer the first side wall portion than the second side wall portion, the aperture shaped to expose a portion of a surface of the optical disc when housed and having a first beveled edge; and
a protecting member adapted to be alternately attached and removed from the cartridge body, the protecting member comprising:
an aperture closing plate having substantially the shape of the aperture and a second beveled edge;
a cover plate; and
a connecting plate holding the aperture closing plate substantially parallel to the cover plate, wherein
when the protective member is attached to the cartridge body, the aperture closing plate obstructs the aperture, the first beveled edge is adjacent to the second beveled edge preventing the aperture closing plate from contacting the optical disc, the connecting plate is adjacent to the first side wall portion, and the cover plate at least partially covers the upper side of the cartridge body.

9. The optical disc protection system of claim 8, wherein the first beveled edge is beveled as to narrow the aperture closer to the upper side and widen the aperture further from the upper side.

10. The optical disc cartridge system of claim 9, wherein when the protective member is attached to the cartridge body the aperture closing plate lays flush with the lower side.

11. The optical disc cartridge system of claim 9, wherein when the protective member is attached to the cartridge body the aperture closing plate is prevented from contacting the disc.

12. The optical disc protection system of claim 8 wherein the cover plate has a width approximately equal to a width of the cartridge body.

13. The optical disc protection system of claim 8, wherein the protecting member further comprises an entering portion connected to the aperture closing plate opposite to where the aperture closing plate joins the connecting plate and angled towards the cover plate, wherein when the protective member is attached to the cartridge body the entering portion is at least partially inside the cartridge body.

14. The optical disc protection system of claim 8, wherein the aperture is adjacent the first side wall.

15. The optical disc protection system of claim 8, wherein the protecting member further comprises a cartridge support that engages on part of the cartridge body when the protective member is attached to the cartridge body.

16. The optical disc protection system of claim 8, wherein the cover plate is at least partially made of a transparent material.

17. A disc cartridge comprising:
a cartridge body, adapted to house a disc, the cartridge body having an upper side substantially parallel to a lower side, the lower side having an aperture shaped to expose a portion of a surface of the disc, the aperture having a perimeter and a first beveled edge along at least a portion of the perimeter; and
a protecting member configured to be alternately attached and removed from the cartridge body, the protecting member comprising:
an aperture closing plate having substantially the shape of the aperture and a second beveled edge that engages the first beveled edge when the protective member is attached to the cartridge body preventing the aperture closing plate from contracting the disc;
a cover plate; and
a connecting plate holding the aperture closing plate substantially parallel to the cover plate.

* * * * *